United States Patent
Stanis

(10) Patent No.: US 11,472,924 B2
(45) Date of Patent: Oct. 18, 2022

(54) METHODS AND SYSTEMS TO DECARBONIZE NATURAL GAS USING SULFUR TO PRODUCE HYDROGEN AND POLYMERS

(71) Applicant: GAS TECHNOLOGY INSTITUTE, Des Plaines, IL (US)

(72) Inventor: Ronald Stanis, Des Plaines, IL (US)

(73) Assignee: GAS TECHNOLOGY INSTITUTE, Des Plaines, IL (US)

( * ) Notice: Subject to any disclaimer, the term of this patent is extended or adjusted under 35 U.S.C. 154(b) by 223 days.

(21) Appl. No.: 16/721,388

(22) Filed: Dec. 19, 2019

(65) Prior Publication Data

US 2020/0199301 A1      Jun. 25, 2020

Related U.S. Application Data

(60) Provisional application No. 62/782,780, filed on Dec. 20, 2018.

(51) Int. Cl.
| | |
|---|---|
| *C08G 75/16* | (2006.01) |
| *B01J 8/00* | (2006.01) |
| *B01D 53/047* | (2006.01) |

(52) U.S. Cl.
CPC ............ *C08G 75/16* (2013.01); *B01J 8/005* (2013.01); *B01D 53/047* (2013.01); *B01D 2257/108* (2013.01); *B01D 2257/30* (2013.01); *B01J 2208/00274* (2013.01); *B01J 2208/00283* (2013.01)

(58) Field of Classification Search
CPC . C08G 75/02; B01J 8/005; B01J 2208/00274; B01J 2208/00283; B01D 53/047; B01D 2257/108; B01D 2257/30
See application file for complete search history.

(56) References Cited

U.S. PATENT DOCUMENTS

| | | | | |
|---|---|---|---|---|
| 574,350 | A | * 12/1896 | Catlin | ............... F41A 19/45 89/154 |
| 2,708,154 | A | 5/1955 | Folkins et al. | |
| 3,345,802 | A | * 10/1967 | Wyatt | ............... C01B 32/70 95/207 |
| 4,816,547 | A | 3/1989 | Tsukamoto et al. | |

(Continued)

FOREIGN PATENT DOCUMENTS

WO     WO 2014/087433 A1     6/2014

OTHER PUBLICATIONS

Cosia, Scan and Evaluation of Natural Gas Decarbonization Technologies, May 9, 2017, (10 pages).

(Continued)

*Primary Examiner* — Shane Fang
(74) *Attorney, Agent, or Firm* — Pauley Erickson & Swanson

(57) ABSTRACT

Methods and systems to decarbonize natural gas using sulfur to produce hydrogen and polymers are provided. Sulfur can be introduced in elemental form or as hydrogen sulfide, as may be desired. Decarbonization of natural gas involves introducing natural gas and $H_2S$ to a first reactor to produce first reactor products including $CS_2$ and $H_2$. The $CS_2$ can subsequently be polymerized and the $H_2$ recovered in a purified form with little or no carbon emissions.

17 Claims, 3 Drawing Sheets

(56) References Cited

U.S. PATENT DOCUMENTS

| | | | |
|---|---|---|---|
| 9,115,047 B2 | 8/2015 | Hattori et al. | |
| 2006/0248921 A1* | 11/2006 | Hosford | B01D 53/047 62/611 |
| 2010/0111824 A1* | 5/2010 | Schlichting | C10K 1/143 423/650 |
| 2013/0217938 A1 | 8/2013 | Waycuilis et al. | |
| 2016/0289142 A1 | 10/2016 | Zubrin et al. | |
| 2017/0101352 A1* | 4/2017 | Marker | C10G 69/126 |

OTHER PUBLICATIONS

U.S. Patent Office, English language version of the International Search Report, Form PCT/ISA/210 for International Application PCT/US2019/068016, dated Mar. 11, 2020 (2 pages).

U.S. Patent Office, English language version of the Written Opinion of the ISA, Form PCT/ISA/237 for International Application PCT/US2019/068016, dated Mar. 11, 2020 (5 pages).

* cited by examiner

METHODS AND SYSTEMS TO DECARBONIZE NATURAL GAS USING SULFUR TO PRODUCE HYDROGEN AND POLYMERS

CROSS REFERENCE TO RELATED APPLICATION

This application also claims the benefit of U.S. Provisional Patent Application, Ser. No. 62/782,780, filed on 20 Dec. 2018. This Provisional Application is hereby incorporated by reference herein in its entirety and is made a part hereof, including but not limited to those portions which specifically appear hereinafter.

BACKGROUND OF THE INVENTION

Field of the Invention

This invention relates generally to natural gas utilization and, more particularly, to processing and systems to decarbonize natural gas using sulfur to produce hydrogen and polymers.

Description of Related Art

Currently, hydrogen is typically or commonly produced from natural gas by steam methane reforming (SMR). Unfortunately, such processing also result in the production of the greenhouse gas pollutant carbon dioxide ($CO_2$).

Methane pyrolysis or non-oxidative coupling technologies are available to produce hydrogen and carbon black from natural gas. The market for carbon black, however, is saturated. Without new business opportunities for carbon black, these routes are not economically competitive.

Decarbonization of natural gas can be utilized in or for the conversion of natural gas to hydrogen gas and solid or liquid carbon or hydrocarbon products. Normal burning of natural gas results in carbon dioxide emissions. An effective decarbonization process should preferably convert natural gas to hydrogen and other carbon-containing products while resulting in $CO_2$ emissions less than those produced via the burning of natural gas. Furthermore, to be an effective $CO_2$ emissions-reducing alternative to SMR processing, decarbonization processing must also produce less $CO_2$ per hydrogen than the SMR process. Such decarbonization processing routes that produce solid carbon are technically mature. The value of the carbon black, however, does not make such processing cost competitive with SMR processing. Such decarbonization processing routes that produce liquid hydrocarbon and hydrogen while not technically mature, are economically challenged, and can result in undesired coke formation.

Elemental sulfur and hydrogen sulfide are typically produced or result as byproducts of or in bitumen and oil refining and natural gas processing. When supply exceeds demand for these byproducts, these materials must be otherwise properly disposed or stored.

Various sources and uses of sulfur in the U.S. exist. As of the year 2000, sources of sulfur in the U.S. include: petroleum refining, natural gas productions, byproduct sulfuric acid, imported sulfur and imported sulfuric acid, for example. As of the year 2000, uses of sulfur in the U.S. include: phosphate fertilizers, petroleum refining, nitrogen fertilizers, other agricultural chemicals, ore leaching and exports, for example.

Globally there is typically a surplus of sulfur as sulfur productions exceeds sulfur demand. The yearly global surplus can be as high as 3.5 million metric tons.

Elemental sulfur is commonly produced by petroleum refineries, natural gas processing plants, and coking companies. Global sulfur production in 2016 was 63.4 million metric tonnes with about 95% of the global sulfur production originating from oil and natural gas. Sulfur inventories may increase due to increasing sulfur content in sour gas and heavy oils combined in increasingly strict fuel quality standards. The USA EPA tier 3 standards require that federal gasolines meet an average annual standard of 10 ppm sulfur starting in 2017. China and Europe have similar standards. The International Maritime Organizations 2020 regulation requires the shipping industry to reduce sulfur gas emission from 3.5% to 0.5%.

Over 85% of the total world production of sulfur is converted to sulfuric acid, at least 50% of which is used for the production of fertilizers, other agricultural uses include pesticides, insecticides, and fungicides. Sulfur is the $4^{th}$ major plant nutrient, after nitrogen, phosphorous, and potassium, it is essential for crop growth. About 35% of sulfuric acid produced goes into the production of detergents, pharmaceuticals, petroleum catalysts, synthetic resins, titanium pigments, viscose, acetates, pickling agents in steel production, and leaching of nonferrous ores.

In 2016, the global sulfur demand was 61.8 million metric tons. There is a general market imbalance that depends on geographic regions. In 2016 there was a global surplus of 1.6 million metric tons. Presently the U.S. is a net importer of sulfur. In 2017 the U.S. produced 9,660,000 metric tons of sulfur, imported 2,950,000 metric tons, and exported 2,326,000 metric tons, resulting in net imports of 624,000 metric tons or 6% of apparent consumption. The import sources of sulfur are: Canada 76%, Mexico 14%, Venezuela 2% and other 8%.

Thus, there is a need and a demand for processing and systems that produce clean hydrogen fuel from natural gas while emitting very little carbon emissions. There is also a need and a demand for processing and systems that desirably utilize what has normally or previously been viewed as waste $H_2S$ or sulfur streams.

SUMMARY OF THE INVENTION

In accordance with selected aspects of the invention, methods and systems are identified and provided for the production of clean hydrogen fuel from natural gas with very little or no carbon emissions. In one embodiment, the carbon is desirably sequestered in or as a polymer.

Another aspect of the invention is the desirable utilization of what has heretobefore been normally deemed waste $H_2S$ or sulfur streams.

In accordance with one embodiment, a method to decarbonize natural gas involves introducing natural gas (e.g., methane) and solid sulfur into a first reactor to produce first reactor products including $CS_2$ and $H_2S$. The first reactor products together with additional natural gas (e.g., methane) are introduced into a second reactor to produce second reactor products including $CS_2$ and $H_2$. At least a portion of the $CS_2$ can subsequently be introduced into a polymerization reactor to produce polymerized $CS_2$. If desired, the $H_2$ can be separated from the $CS_2$ prior to introduction of the $CS_2$ into the polymerization reactor. Alternatively, such as where, for example, $H_2$ is inert in the polymerization reactor or where the presence of $H_2$ does not cause or result in undesired reactions or processing complications, the $H_2$ can be introduced into the polymerization reactor as hydrogen gas may more easily be separated from the solid $CS_2$ polymer rather than vapor phase $CS_2$.

In accordance with another embodiment, a method to decarbonize natural gas involves introducing natural gas (e.g., methane) and $H_2S$ into a reactor to produce reactor products including $CS_2$ and $H_2$, followed by introducing at least a portion of the $CS_2$ into a polymerization reactor to produce polymerized $CS_2$. If desired, at least a portion of the $CS_2$ introduced into the polymerization reactor can be separated from the $H_2$ prior to its introduction into the polymerization reactor. In another embodiment, both $CS_2$ and $H_2$ can be introduced into the polymerization reactor. Gaseous $H_2$ can subsequently be separated or recovered from the polymerized $CS_2$.

In accordance with one aspect of the invention, a method using sulfur to decarbonize natural gas is provided.

In one embodiment, such method involves introducing natural gas and $H_2S$ to a first reactor to produce first reactor products including $CS_2$ and $H_2$ and then polymerizing at least a portion of the $CS_2$ to produce polymerized $CS_2$. If one particular embodiment, the $CS_2$ for polymerization can be separated from $H_2$ prior to said polymerization. In an alternative embodiment, $H_2$ is separated or recovered from the polymerized $CS_2$.

In accordance with one aspect of the invention, a method using sulfur to produce hydrogen and polymers from natural gas is provided.

In one embodiment, such method involves introducing natural gas and $H_2S$ to a reactor to produce first reactor products including $CS_2$ and $H_2$. The first reactor products are subsequently introduced into an oil absorption separation system to separate $CS_2$ as a liquid stream and $H_2$ as portion of a gas stream. At least a portion of the separated $CS_2$ is subsequently introduced into a polymerization reactor to produce polymerized $CS_2$. $H_2$ is separated and desirably recovered from other gaseous species (e.g., $H_2S$ and $CH_4$) in the gas stream, with at least a portion of the other gaseous species desirably being recycled to the first reactor.

In accordance with another aspect of the invention, a system for producing hydrogen and polymers from natural gas using sulfur is provided.

In one embodiment, such a system includes a first reactor wherein natural gas and $H_2S$ are introduced to produce first reactor product stream including $CS_2$ and $H_2$. The system further includes a separator wherein the first reactor product stream is introduced to form a $CS_2$ stream and a gaseous species stream including $H_2$, $CH_4$, and $H_2S$. A polymerization reactor is provided wherein at least a portion of the $CS_2$ stream is introduced to produce polymerized $CS_2$. A $H_2$ separator is provided wherein at least a portion of the gaseous species stream is introduced to separate $H_2$ from other gaseous species to form an $H_2$ stream and a recycle stream of other gaseous species including $CH_4$, and $H_2S$. A recycle line is provided to introduce the recycle stream to the first reactor.

As used herein, references to "natural gas" (sometimes also referred to as "fossil gas") are to be understood to generally refer to the naturally occurring hydrocarbon gas mixtures comprising or consisting primarily of methane, but commonly also including varying amounts of other higher alkanes, and sometimes a small percentage of carbon dioxide, nitrogen, hydrogen sulfide, or helium. A typical composition of natural gas is set forth in the TABLE below:

TABLE

TYPICAL NATURAL GAS COMPOSITION

| Compound | Symbol | Percent in Natural Gas |
|---|---|---|
| Methane | $CH_4$ | 40-100 |
| Ethane | $C_2H_6$ | 0-20 |
| Propane | $C_3H_8$ | 0-20 |
| Butane | $C_4H10$ | 0-20 |
| Carbon dioxide | $CO_2$ | 0-60 |
| Oxygen | $O_2$ | 0-0.2 |
| Nitrogen | $N_2$ | 0-5 |
| Hydrogen sulphide | $H_2S$ | 0-5 |
| Rare gases | A, He | 0-2 |

Moreover, while natural gas typically includes or contains 40-100% methane, those skilled in the art and guided by the teaching herein provided are to understand and appreciate that, if desired, the invention can be practiced with gases having 25% or less methane.

Other objects and advantages will be apparent to those skilled in the art from the following detailed description taken in conjunction with the appended claims and drawings.

DETAILED DESCRIPTION

As detailed further below, one aspect of the subject development relates to the conversion of natural gas and waste sulfur or hydrogen sulfide ($H_2S$) to hydrogen gas and polymers.

In one embodiment, with $H_2S$ as a feed stream, natural gas is reacted with hydrogen sulfide ($H_2S$) in a first reactor to produce hydrogen gas and carbon disulfide ($CS_2$). The product gas is cooled to a temperature sufficient to condense the $CS_2$ to a liquid (e.g., 46° C. at atmospheric pressure) to allow hydrogen to be separated as a gas stream. The resulting liquid $CS_2$ is sent to a second reactor where it is polymerized. Some hydrogen may be blended with the $CS_2$ feedstock to adjust the properties of the $CS_2$ polymer. If $H_2S$ is available from nearby sources or economically imported it may be used as is. If $H_2S$ is not readily available it may be produced from elemental sulfur by reaction with a natural gas according to the reaction (where natural gas is represented by its majority component, $CH_4$):

$$2CH_4 + S_8 \rightarrow 2CS_2 + 4H_2S.$$

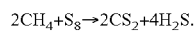

The $CS_2$ polymer may be used on its own or as a filler and/or strengthening agent in rubber or concrete or other materials, for example.

Polymerization of $CS_2$ can be performed using various techniques known in the art including and not necessarily limited to: heat and pressure (with or without catalyst), ultrasonic treatment, gamma-ray irradiation, plasma, anionic polymerization using sodium initiators, UV irradiation, shockwaves, electric discharges, and high energy radiation, for example.

As will be appreciated by those skilled in the art and guided by the teachings herein provided, the subject invention allows for the decarbonizaton of natural gas together with a utilization of waste sulfur streams from other processes. The resulting carbon sulfide polymer can be used for making a variety of products or materials, including but not necessarily limited to: filler in plastics, rubber, or concrete. Moreover, the carbon in the natural gas can desirably be sequestered in a solid product form. The hydrogen can be used as fuel, as feed for fertilizer production, employed in industrial uses or otherwise appropriately utilized as may be desired.

In accordance with one preferred practice of the subject development, the following three key reactions can desirably be combined and employed to decarbonize natural gas to produce hydrogen and, if desired, carbon sulfide polymer (where natural gas is again represented by its majority component, $CH_4$):

$$2CH_4 + S_8 \rightarrow 2CS_2 + 4H_2S \qquad 1)$$

$$4H_2S + 2Ch_4 \rightarrow 2CS_2 + 8H_2 \qquad 2)$$

$$CS_2 \rightarrow \text{polymerized } CS_2 \qquad 3)$$

Figure 1:
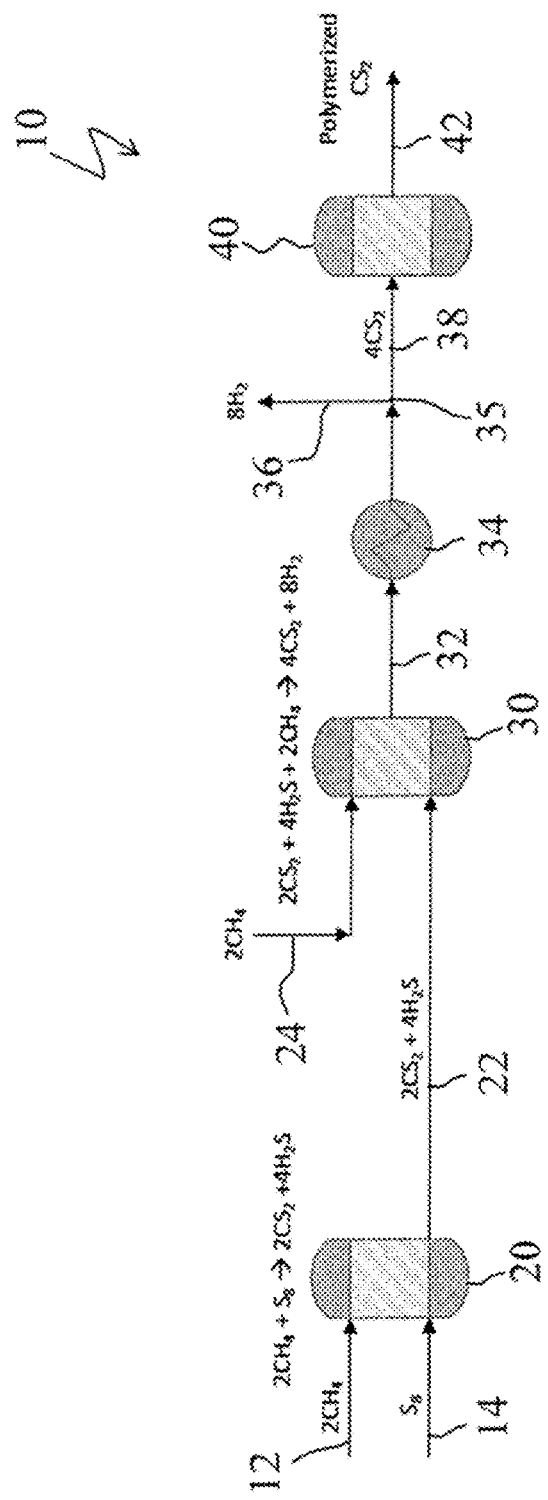
FIG. 1 is a simplified conceptual process flow diagram of processing to decarbonize natural gas using sulfur to produce hydrogen and polymers, the processing starting with elemental sulfur in accordance one embodiment of the invention.

FIG. 1 schematically illustrates a system, generally designated by the reference numeral 10, for the decarbonization of methane in accordance with one embodiment of the invention. As detailed below, the system 10 utilizes solid sulfur as a sulfur input source and results in the production of hydrogen gas ($H_2$) and polymerized $CS_2$ as products.

More particularly, methane such as in the form of a methane-containing natural gas and solid sulfur are respectively introduced via lines 12 and 14 into a hydrogen sulfide-forming reactor 20 (sometimes referred to as a first reactor) to produce a product stream such as including $CS_2$ and $H_2S$ and such as passed via a line 22.

The hydrogen sulfide-forming reactor product stream in the line 22 or at least a portion thereof is introduced in a reactor 30 (sometimes referred to as a hydrogen and carbon disulfide-forming reactor or a second reactor). Methane, such as in the form of a methane-containing natural gas, is introduced as a stream in a line 24 into the second reactor 30. The second reactor 30 produces a product stream such as including $CS_2$ and $H_2$ and conveyed via a line 32. The product stream in the line 32 can be processed through a heat exchanger device 34 to effect cooling. Optionally, $CS_2$ can be separated from $H_2$ such as represented at point 35 to form an $H_2$ stream in line 36 and a $CS_2$ stream in line 38. The $CS_2$ stream in line 38 can then be processed through a polymerization reactor 40 to produce a product stream of polymerized $CS_2$ such as by way of one or more of the above-identified techniques and which product polymerized $CS_2$ is conveyed via a line 42. Where, for example, $H_2$ is inert in the polymerization reactor or where the presence of $H_2$ does not cause or result in undesired reactions or processing complications, the $H_2$ can be introduced into the polymerization reactor as hydrogen gas may more easily be separated from the solid $CS_2$ polymer rather than vapor phase $CS_2$.

Figure 2:
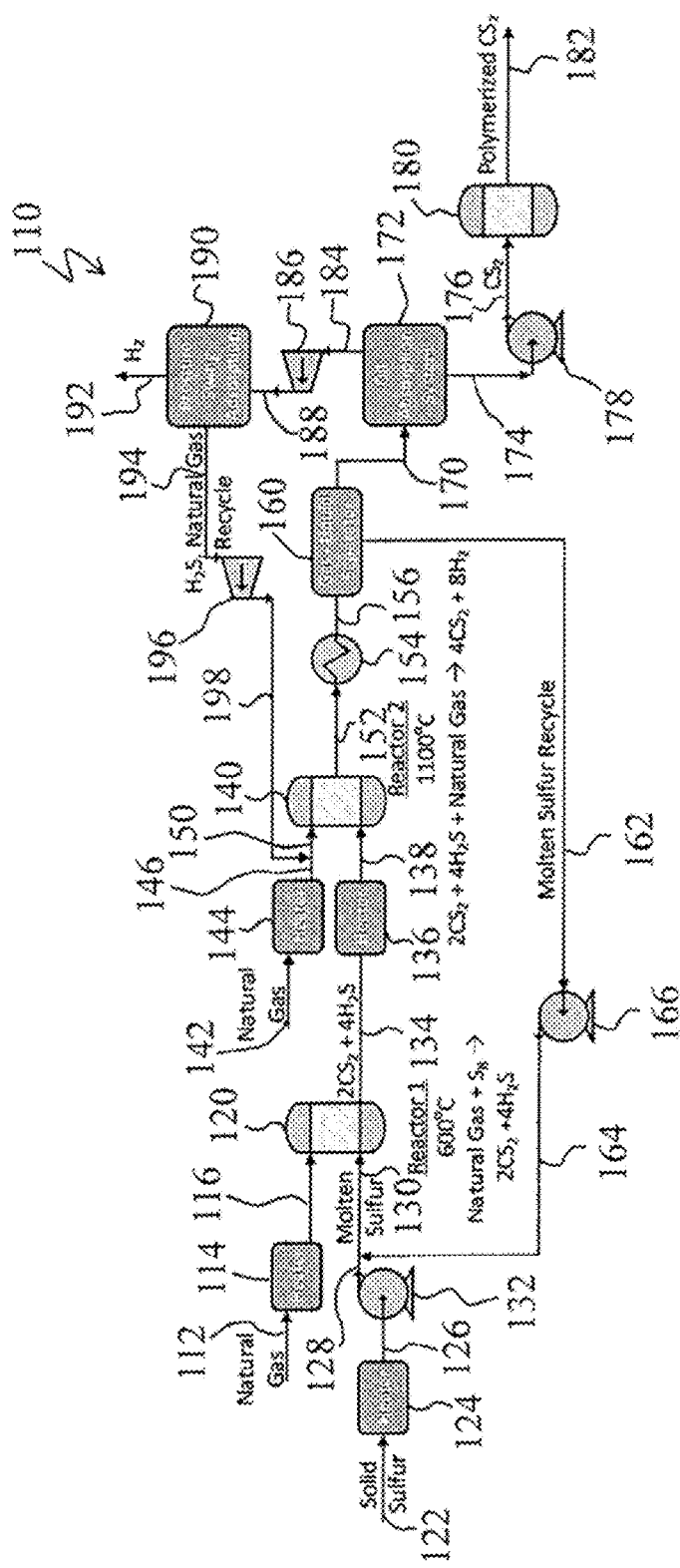
FIG. 2 is a simplified process flow diagram of processing to decarbonize natural gas using sulfur to produce hydrogen and polymers, the processing starting with elemental sulfur in accordance one embodiment of the invention.

FIG. 2 illustrates in greater detail a system, generally designated by the reference numeral 110, for the decarbonization of natural gas that utilizes solid sulfur as a sulfur input source and results in the production of hydrogen gas ($H_2$) and polymerized $CS_2$ as products in accordance with an embodiment of the invention.

In the system 110, natural gas is introduced via a line 112 into a heater 114 to form a stream of heated natural gas (such as at a temperature of 535° C. and 100 psig). A stream of heated natural gas is passed via a line 116 to a hydrogen sulfide-forming reactor 120 (sometimes referred to as Reactor 1). Similarly, solid sulfur such as in a line 122 is introduced into a heater 124 and appropriately heated such as to a temperature of 600° C. to generate sulfur vapor such as at 100 psig. The sulfur vapor is conveyed, such as via lines 126, 128, and 130 and via a pump 132 to the hydrogen sulfide-forming reactor 120.

In the hydrogen sulfide-forming reactor 120, the natural gas and sulfur react to form $CS_2$ and $H_2S$, such as shown by below by reaction 4):

$$\text{Natural gas} + S_8 \rightarrow 2CS_2 + 4H_2S. \qquad 4)$$

To that end, the mole ratio of sulfur to carbon in the feed to the hydrogen sulfide-forming reactor 120 is desirably about 2.5 to 3, preferably about 2.7. The hydrogen sulfide-forming reactor 120 can desirably contain or include an appropriate catalyst, e.g., silica gel, and is appropriately maintained at a desired elevated temperature e.g., 600° C., to effect the desired reaction. As the reaction is endothermic, heat is appropriately applied or supplied to the reactor 120 such as by steam, the burning of natural gas or other fuel material, electric heaters or other appropriate heating device (not specifically shown). The conversion of sulfur in the hydrogen sulfide-forming reactor is typically greater than 80%, preferably at least about 85%. The conversion of natural gas in the hydrogen sulfide-forming reactor is typically greater than 85%, preferably at least about 90%.

The reactor 120 produces a product stream such as including $CS_2$ and $H_2S$ that is conveyed via a line 134 to a heater 136 such as to raise the gas temperature to about 1100° C. The heated $CS_2$ and $H_2S$ are conveyed via a line 138 to a hydrogen and carbon disulfide-forming reactor 140 (sometimes referred to as Reactor 2). Natural gas, is introduced as a stream in a line 142 into a heater 144 (e.g., 1100° C. and 100 psig) resulting in a stream of heated natural gas that is conveyed via the lines 146 and 150 to the hydrogen and carbon disulfide-forming reactor 140.

The hydrogen and carbon disulfide-forming reactor 140 can desirably be a vessel packed with an appropriate catalyst, such as known in the art, to effect the following reaction 5):

$$2CS_2 + 4H_2S + \text{Natural gas} \rightarrow 4CS_2 + 8H_2 \qquad 5)$$

The hydrogen and carbon disulfide-forming reactor 140 is appropriately maintained at a desired elevated temperature e.g., 1100° C., to effect the desired reaction. As the reaction is endothermic, heat can be appropriately applied or supplied to the reactor 140 such as by steam, the burning of natural gas or other fuel material, electric heaters or other appropriate heating device (not specifically shown).

In the reactor 140, the conversion of natural gas to $CS_2$ and hydrogen is at or near 100% and the conversion of $H_2S$ to $CS_2$ and hydrogen is at or near 50%.

The reactor 140 produces a product stream containing $CS_2$ and $H_2$ whose pressure is reduced from 100 psig to about 10 psig and is conveyed via a line 152 to a heat exchanger/cooler device 154 to effect cooling and a reduction in temperature to about 32° C. The cooled product stream is conveyed via a line 156 to a gas-liquid separator 160 to effect condensation of sulfur vapor of or in the gas stream to a liquid and separation of the liquid from the gas streams. Residual sulfur, e.g., molten sulfur, is recycled or otherwise returned via lines 162, 164, and 130 by way of pump 166 to the hydrogen sulfide-forming reactor 120. The cooled gases separated by the gas-liquid separator 160 are conveyed via a line 170 to a desired separation system or scheme 172, such as an oil absorption separation system, for example, to effect separation of $CS_2$ from the other materials (e.g., $H_2$ and $H_2S$) such as by the $CS_2$ being oil absorbed. It is to be understood and appreciated that the separation can be effected by other suitable separation systems or schemes as will be apparent to those skilled in the art and guided by the teachings herein provided.

The absorbed $CS_2$ is released or recovered from the oil. At least a portion of the recovered $CS_2$ is conveyed via the lines 174 and 176 by way of pump 178 to a desired $CS_2$ polymerization reactor 180 to form polymerized $CS_2$ conveyed via a line 182. The $CS_2$ polymerization reactor 180 can suitably polymerize $CS_2$ such as by way of one or more of the above-identified polymerization techniques.

Suitable operating conditions for the absorber and stripper for the oil absorption separation system are identifiable by those skilled in the art. For example, U.S. Pat. No. 3,345,802 identifies operating conditions for such absorbers and strippers such as $CS_2$ being released at 121° C. and 10 psig.

As identified above, the feeding of the cooled gas stream to the oil absorption system results in absorption of the $CS_2$ product and separation of the absorbed $CS_2$ from the resulting $H_2$ and $H_2S$ gas stream. The resulting stream is about 33% $H_2S$ and 67% hydrogen and can be forwarded to a guard bed (not specifically shown) or other appropriate device or system to remove remaining, if any, $CS_2$ impurities. The $H_2$ and $H_2S$ gas stream can then be split such as with 20% of it being used as a stripping gas for the oil absorption system and then recompressed such as from 5 psig to 10 psig, with the stripping gas being then recombined with the remaining $H_2$ and $H_2S$ containing gas. The $H_2$ and $H_2S$ gas is conveyed via a line 184 to a compressor 186 such as to be compressed, such as to 300 psig, and cooled, such as to 31° C., and fed via a line 188 to a purification system, for example a pressure swing absorption (PSA) system 190, where pure $H_2$ is generated at such as at 150 psig and 37° C. and conveyed via a line 192.

The tail gas from the PSA system 190, comprising mostly $H_2S$ is conveyed via a line 194 to a compressor 196 and compressed, such as to 100 psig, and cooled, such as to 38° C., and is recycled back to the carbon disulfide reactor 140 via lines 198 and 150.

Figure 3:
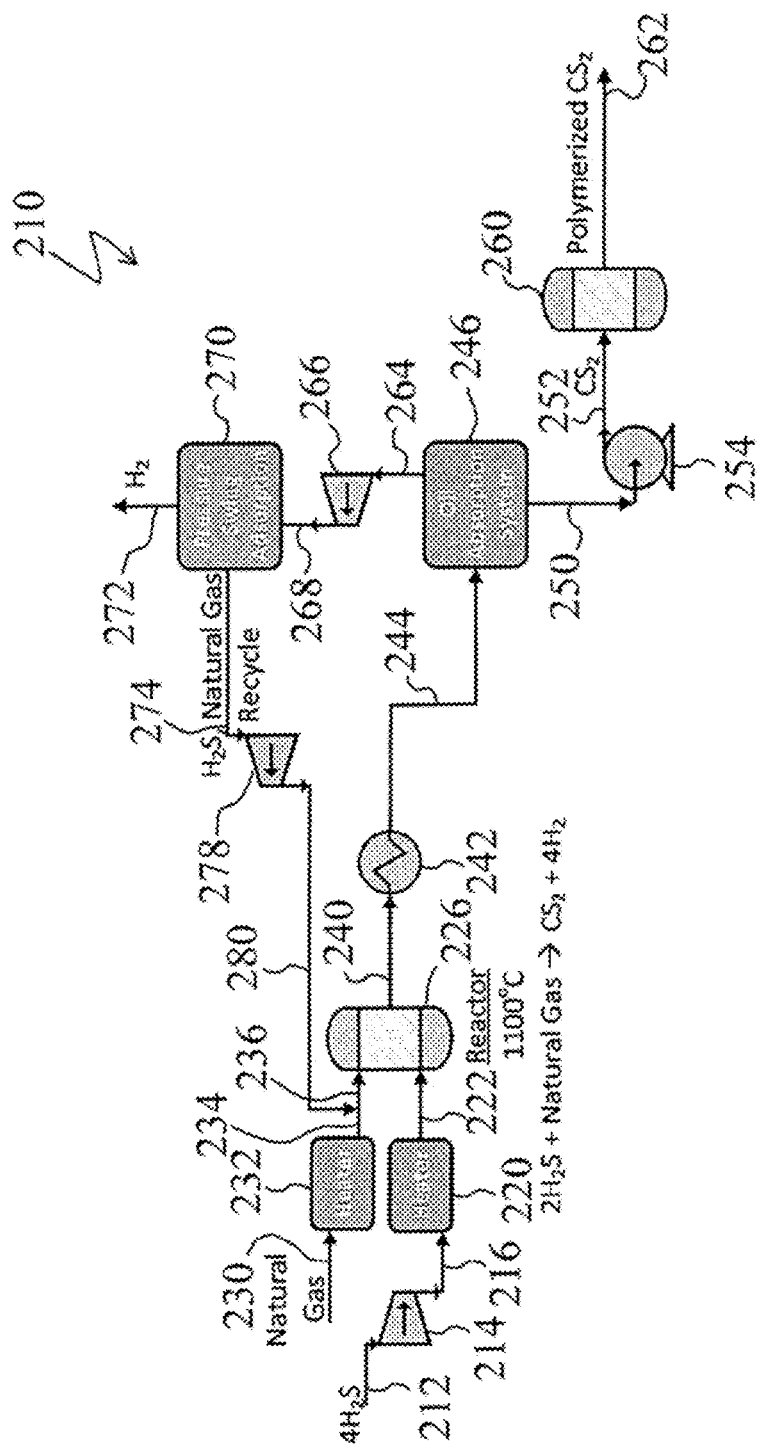
FIG. 3 is a simplified process flow diagram of processing to decarbonize natural gas using sulfur to produce hydrogen and polymers, the processing starting with $H_2S$ as a sulfur input source in accordance one embodiment of the invention.

FIG. 3 depicts a process flow diagram of processing starting with $H_2S$ as a sulfur input source in accordance one embodiment of the invention.

FIG. 3 illustrates a system, generally designated by the reference numeral 210, for the decarbonization of natural gas that utilizes $H_2S$ as a sulfur input source and results in the production of hydrogen gas ($H_2$) and polymerized $CS_2$ as products in accordance with an embodiment of the invention.

In the system 210, $H_2S$ such as at 5 psig is introduced via a line 212 into a compressor 214 such to increase the gas pressure to 100 psig and introduced via a line 216 into a heater 220. In the heater 220, the material is heated to a temperature of 1100° C. and introduced via a line 222 as a stream into a hydrogen and carbon disulfide-forming reactor 226. Correspondingly, natural gas is introduced via a line 230 into a heater 232 and also desirably preheated to a temperature of 1000° C., with the heated natural gas introduced via lines 234 and 236 into the hydrogen and carbon disulfide-forming reactor 226. The combined feed streams to the hydrogen and carbon disulfide-forming reactor 226 are desirably blended and have a ratio of 4:1 $H_2S$ to natural gas, on a volume basis.

The hydrogen and carbon disulfide-forming reactor 226 can desirably be a vessel packed with an appropriate solid catalyst, such as known in the art, to effect the following reaction 6):

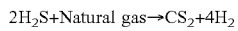

$$2H_2S + \text{Natural gas} \rightarrow CS_2 + 4H_2 \qquad 6)$$

The hydrogen and carbon disulfide-forming reactor 226 desirably operates where 100% of the natural gas is converted to $CS_2$ and hydrogen, and 50% of the $H_2S$ is reacted to $CS_2$ and hydrogen.

As with the above-described embodiment, as the reaction is endothermic, heat can be appropriately applied or supplied to the reactor 226 such as by steam, the burning of natural gas or other fuel material, electric heaters or other appropriate heating device (not specifically shown).

The hydrogen and carbon disulfide-forming reactor 226 produces a product stream containing $CS_2$ and $H_2$ whose pressure is reduced from 100 psig to about 10 psig and is conveyed via a line 240 to a heat exchanger/cooler device 242 to effect cooling and a reduction in temperature to about 32° C. The cooled product stream is conveyed via a line 244 to a desired separation system or scheme 246, such as an oil absorption separation system, for example, to effect separation of $CS_2$ from the other materials (e.g., $H_2$ and $H_2S$), such as in the case of an oil absorption separation system, by the $CS_2$ being absorbed by oil.

The absorbed $CS_2$ is released or recovered from the oil. At least a portion of the received $CS_2$ is conveyed via the lines 250 and 252 by way of pump 254 to a desired $CS_2$ polymerization reactor 260 to form polymerized $CS_2$ conveyed via a line 262. The $CS_2$ polymerization reactor 260 can suitably polymerize $CS_2$ such as by way of one or more of the above-identified polymerization techniques.

Suitable operating conditions for the absorber and stripper for the oil absorption separation system are identifiable by those skilled in the art. For example, U.S. Pat. No. 3,345,802 identifies operating conditions for such absorbers and strippers such as $CS_2$ being released at 121° C. and 10 psig.

As identified above, the feeding of the cooled gas stream to the oil absorption system results in absorption of the $CS_2$ product and separation of the absorbed $CS_2$ from the resulting $H_2$ and $H_2S$ gas stream. The resulting stream is about 33% $H_2S$ and 67% hydrogen and can be forwarded to a guard bed (not specifically shown) or other appropriate device or system to remove remaining, if any, $CS_2$ impurities. The $H_2$ and $H_2S$ gas stream can then be split such as with 20% of it being used as a stripping gas for the oil absorption system and then recompressed such as from 5 psig to 10 psig, with the stripping gas being then recombined with the remaining $H_2$ and $H_2S$ containing gas. The H and $H_2S$ gas is conveyed via a line 264 to a compressor 266 such as to be compressed, such as to 300 psig, and cooled, such as to 31° C., and fed via a line 268 to a purification system, for example a pressure swing absorption (PSA) system 270, where pure $H_2$ is generated at such as at 150 psig and 37° C. and conveyed via a line 272.

The tail gas from the PSA system 190, comprising mostly $H_2S$ is conveyed via a line 274 to a compressor 278 and compressed, such as to 100 psig, and cooled, such as to 38° C., and is recycled back to the hydrogen and carbon disulfide-forming reactor 226 via lines 280 and 236.

The subject invention development allows for the decarbonizaton of natural gas and with a use for waste sulfur streams from other processes. The resulting carbon sulfide polymer can be used for making a variety of different products, used as filler in plastics, rubber, or concrete, etc. The carbon present in the natural gas is desirably sequestered in a solid product. The hydrogen can be used as fuel, feed for fertilizer production or industrial uses, as may be desired. It is to be particularly noted and appreciated that methods and systems of the invention can serve to not only decarbonize natural gas and utilize sulfur but also to produce and recover $H_2$, desirably in a purified form, with little or no carbon emissions.

As will be appreciated, advantages resulting or associated with the subject invention and the practice thereof can include:
1. a polymer is produced as the side product rather than carbon black; and
2. sulfur or $H_2S$, normally waste streams, can be utilized as a feedstock and turned into useful products.

The subject development illustratively disclosed herein suitably may be practiced in the absence of any element, part, step, component, or ingredient which is not specifically disclosed herein.

While in the foregoing detailed description the subject development has been described in relation to certain preferred embodiments thereof, and many details have been set forth for purposes of illustration, it will be apparent to those skilled in the art that the subject development is susceptible to additional embodiments and that certain of the details described herein can be varied considerably without departing from the basic principles of the invention.

What is claimed includes:

1. A method using sulfur to decarbonize natural gas, the method comprising:
    introducing natural gas and $H_2S$ to a first reactor to produce first reactor products including $CS_2$ and $H_2$, wherein a temperature of the natural gas and $H_2S$ and the first reactor products are within a range of 600° C. to 1100° C.; and
    introducing at least a portion of the $CS_2$ into a polymerization reactor to produce polymerized $CS_2$; wherein a conversion of the natural gas to the $CS_2$ and the $H_2$ is at or near 100% and a conversion of the $H_2S$ to the $CS_2$ and the $H_2$ is at or near 50%.

2. The method of claim 1 wherein prior to said step of introducing natural gas and $H_2S$ to the first reactor, the method additionally comprises:
    introducing sulfur and natural gas into a hydrogen sulfide-forming reactor to at least in part produce the $H_2S$ and a first amount of $CS_2$; and
    introducing the first amount of $CS_2$ with the natural gas and the $H_2S$ to the first reactor to produce the first reactor products, where the first rector products include an additional second amount of $CS_2$ added to the first amount of $CS_2$.

3. The method of claim 1 wherein the polymerized $CS_2$ is produced in a continuous process via application of one or more techniques selected from the group consisting of: heat and pressure (with or without catalyst), ultrasonic treatment, gamma-ray irradiation, plasma, UV irradiation, shockwaves, electric discharges, and high energy radiation.

4. The method of claim 1 wherein prior to said step of introducing at least a portion of the $CS_2$ into a polymerization reactor, the method additionally comprises:
    separating $CS_2$ from $H_2$ in the first reactor products.

5. The method of claim 4 wherein said separating the $CS_2$ from the $H_2$ in the first reactor products comprises:
    introducing the first reactor products into an oil absorption separation system to separate $CS_2$ as a liquid stream and $H_2$ as portion of a gas stream;
    separating $H_2$ from other gaseous species in the gas stream, the other gaseous species comprising $H_2S$ and $CH_4$; and
    recycling at least a portion of the other gaseous species to the first reactor.

6. The method of claim 5 additionally comprising:
    recovering $CS_2$ from the oil absorption separation system and
    conveying at least a portion of the recovered $CS_2$ to the polymerization reactor.

7. The method of claim 5 wherein the step of separating $H_2$ from other gaseous species in the gas stream comprises introducing the gas stream into a pressure swing absorption system to produce a stream of $H_2$.

8. The method of claim 1 wherein the step of introducing at least a portion of the $CS_2$ also comprises introducing at least a portion of the $H_2$ into the polymerization reactor.

9. The method of claim 8 wherein the polymerization reactor discharges $H_2$ in addition to polymerized $CS_2$, the method additionally comprising recovering at least a portion of the $H_2$ discharged from the polymerization reactor.

10. A method using sulfur to produce hydrogen and polymers from natural gas, the method comprising:
    introducing natural gas and $H_2S$ to a reactor to produce first reactor products including $CS_2$ and $H_2$, wherein a temperature of the natural gas, $H_2S$, and a reaction within the first reactor is 600° C. to 1100° C.;
    separating $CS_2$ as a liquid stream and $H_2$ as portion of a gas stream from the second reactor products;
    introducing at least a portion of the separated $CS_2$ into a polymerization reactor to produce polymerized $CS_2$
    separating $H_2$ from other gaseous species in the gas stream, the other gaseous species comprising $H_2S$ and $CH_4$; and
    recycling at least a portion of the other gaseous species to the first reactor; wherein a conversion of the natural gas to the $CS_2$ and the $H_2$ is at or near 100% and a conversion of the $H_2S$ to the $CS_2$ and the $H_2$ is at or near 50%.

11. The method of claim 10 wherein prior to said introducing step of natural gas and $H_2S$, said method additionally comprises:
    introducing sulfur and natural gas into a hydrogen sulfide-forming reactor to at least in part produce the $H_2S$ at a temperature of 600° C.

12. The method of claim 10 wherein the polymerized $CS_2$ is produced in a continuous process via application of one or more techniques selected from the group consisting of: heat and pressure (with or without catalyst), ultrasonic treatment, gamma-ray irradiation, plasma, UV irradiation, shockwaves, electric discharges, and high energy radiation.

13. The method of claim 10 additionally comprising:
    recovering $CS_2$ from the oil absorption separation system and
    conveying at least a portion of the recovered $CS_2$ to the polymerization reactor.

14. The method of claim 11 wherein the step of separating $H_2$ from other gaseous species in the gas stream comprises introducing the gas stream into a pressure swing absorption system to produce a stream of $H_2$.

15. The system of claim 1, wherein introducing the at least a portion of the $CS_2$ into the polymerization reactor comprises feeding a continual supply of the $CS_2$ to the polymerization reactor.

16. The system of claim 1, further comprising:
   introducing sulfur and a first supply of natural gas into a hydrogen sulfide-forming reactor upstream of the first reactor, to produce upstream reactor products including $CS_2$ and $H_2S$;
   introducing the upstream reactor products to the first reactor.

17. The system of claim 1, wherein the at least a portion of the $CS_2$ introduced into the polymerization reactor comprises a vapor.

* * * * *